US012115759B2

(12) United States Patent
Seibold et al.

(10) Patent No.: US 12,115,759 B2
(45) Date of Patent: Oct. 15, 2024

(54) THERMOPLASTIC ELASTOMERIC (TPE) PIPE CONVEYOR BELTS

(71) Applicant: ContiTech Transportbandsysteme GmbH, Hannover (DE)

(72) Inventors: Sebastian Seibold, Hannoversch Muenden (DE); Andrey Minkin, Adelebsen (DE); Christel Bäuerle-Müller, Hannoversch Muenden (DE); Stavros Podias, Goettingen (DE); Frank Kantorek, Lehrte (DE); Mohamad Bachir, Medina, OH (US); Donald Brown, Marysville, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 55 days.

(21) Appl. No.: 18/062,088

(22) Filed: Dec. 6, 2022

(65) Prior Publication Data

US 2024/0181754 A1    Jun. 6, 2024

(51) Int. Cl.
*B32B 25/08* (2006.01)
*B32B 3/08* (2006.01)
(Continued)

(52) U.S. Cl.
CPC ............... *B32B 25/08* (2013.01); *B32B 3/08* (2013.01); *B32B 5/12* (2013.01); *B32B 27/32* (2013.01);
(Continued)

(58) Field of Classification Search
CPC ........ B65G 25/08; B65G 15/08; B65G 15/40; B65G 15/36; B65G 15/34; B32B 3/08; B32B 5/12; B32B 27/32
(Continued)

(56) References Cited

U.S. PATENT DOCUMENTS

| 6,991,093 B2 * | 1/2006 | Tschantz | ................ B65G 15/08 198/818 |
| 7,942,259 B2 | 5/2011 | Steven et al. | |

(Continued)

FOREIGN PATENT DOCUMENTS

| CN | 105621011 A | 6/2016 |
| CN | 211711784 | 10/2020 |

(Continued)

OTHER PUBLICATIONS

International Search Report dated Feb. 19, 2024 corresponding to International Application PCT/EP2023/082879.

*Primary Examiner* — James R Bidwell (57) ABSTRACT

A pipe belt system comprising one or more thermoplastic elastomeric (TPE) layers and a reinforcement layer is disclosed. The one or more thermoplastic elastomeric (TPE) layers have a first modulus of elasticity and a first stiffness and formed across a width of the belt. The reinforcement layer is formed proximate to the one or more TPE layers and has a second modulus of elasticity and a second stiffness. The pipe belt is configured to have an open state where the belt is substantially flat and a closed state where the belt is formed having a circular shape and partially overlaps itself. The pipe belt has a combined modulus of elasticity based on the first modulus of elasticity and the second modulus of elasticity and a combined stiffness based on the first stiffness and the second stiffness.

20 Claims, 8 Drawing Sheets

(51) Int. Cl.
*B32B 5/12* (2006.01)
*B32B 27/32* (2006.01)
*B65G 15/34* (2006.01)

(52) U.S. Cl.
CPC .......... *B65G 15/34* (2013.01); *B32B 2274/00* (2013.01); *B32B 2307/546* (2013.01); *B32B 2307/732* (2013.01); *B32B 2433/02* (2013.01)

(58) Field of Classification Search
USPC .................................................. 198/818, 819
See application file for complete search history.

(56) References Cited

U.S. PATENT DOCUMENTS

| | | | |
|---|---|---|---|
| 10,273,087 B2 * | 4/2019 | Minkin | B65G 15/42 |
| 2010/0018841 A1 * | 1/2010 | Steven | B65G 15/40 |
| | | | 198/819 |
| 2012/0000751 A1 | 1/2012 | Boursier | |
| 2019/0225424 A1 | 7/2019 | Yang et al. | |
| 2022/0135335 A1 | 5/2022 | Boursier | |

FOREIGN PATENT DOCUMENTS

| | | | | |
|---|---|---|---|---|
| DE | 102014218443 A1 * | 3/2016 | ............ | B65G 15/34 |
| JP | 2009155059 A | 7/2009 | | |
| JP | 2019011197 A | 1/2019 | | |

* cited by examiner

New TPE Belt With One Fabric Layer

TPE Belt With Shorter Fabric

TPE Belt With Variant TPE Modulus At Ends

TPE Belt With Variant End TPE Modulus

FIG. 8

THERMOPLASTIC ELASTOMERIC (TPE) PIPE CONVEYOR BELTS

FIELD

The field to which the disclosure generally relates is pipe belts.

BACKGROUND

Pipe conveyor belts, or tube conveyor belts, are close-trough belts used for enclosed material transport. These belts allow significantly tighter curves and higher angles of inclination than conventional troughed conveyor belts and can alter from a loading shape, such as flat, to a conveying pipe shape.

Pipe belts can be used to convey material without spillages or dissipation as the pipe belts are substantially enclosed when in the pipe shape. Pipe belts can be used where bulk materials are conveyed along horizontal and vertical curves in confined spaces, and/or where the environment and the bulk material have to be protected from each other and where spillage or dust should be avoided. A pipe belt can negotiate tight horizontal and vertical curves. This can eliminate or reduce transfer points that transfer material from one belt to another. A wide range of inclinations/declinations can be used.

Pipe belts are subject to large amounts of abrasion, contact, pressure, bending and the like, which can degrade the belts and/or result in leakage. Additionally, pipe belts and its splices are difficult and costly to construct.

Techniques are needed to mitigate abrasion and the like while also being simpler and less costly.

DETAILED DESCRIPTION

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one, and the singular also includes the plural unless otherwise stated.

The terminology and phraseology used herein is for descriptive purposes and should not be construed as limiting in scope. Language such as "including", "comprising", "having", "containing", or "involving", and variations thereof, is intended to be broad and encompass the subject matter listed thereafter, equivalents, and additional subject matter not recited.

Also, as used herein, any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Pipe conveyor belts, or tube conveyor belts, are close-trough belts used for enclosed material transport. These belts allow significantly tighter curves and higher angles of inclination than conventional troughed conveyor belts and can alter from a loading shape, such as flat, to a conveying pipe shape.

Pipe belts can be used to convey material without spillages or dissipation as the pipe belts are substantially enclosed when in the pipe shape. Pipe belts can be used where bulk materials are conveyed along horizontal and vertical curves in confined spaces, and/or where the environment and the bulk material have to be protected from each other and where spillage or dust should be avoided. A pipe belt can negotiate tight horizontal and vertical curves. This can eliminate or reduce transfer points that transfer material from one belt to another. A wide range of inclinations/declinations can be used.

It is appreciated that pipe belts have several advantages, such as conveyed material is protected against influences from the environment (e.g. rain) and the like. Additionally, the environment is protected from the conveyed material, as it cannot be spilled or blown into the landscape. Furthermore, pipe belts have the possibility to convey material in higher incline angles and with smaller horizontal curve angles of the conveyor system.

Pipe belts are designed to have a specific belt transverse stiffness, which is generated by the design of the belt, comprising the elastomeric (rubber) material and the stiff thermoplastic fabric material or steel breakers. Usually, the rubber material is not stiff enough to allow proper folding and de-folding (also referred to as roll-in and roll-up) of the pipe belt. Some other problems are: pipe belt collapsing in folded position, pipe belt not de-folding in charge or discharge area, pipe belt re-opening between idler spacings, pipe belt not maintaining a proper (e.g. round) shape, belt edge overlapping is too long or too small and does not seal pipe belt properly.

The low stiffness of the elastomeric material based conveyor belts can be compensated by layers of reinforcing fabric or steel breakers to provide the proper or optimum stiffness for each specific pipe belt diameter. The higher content of thermoplastic yarns in weft direction is tailoring the needed stiffness of the whole belt design.

Pipe belts are subject to large amounts of abrasion, contact, pressure, bending and the like, which can degrade the belts and/or result in spillages. Additionally, pipe belts are difficult and costly to construct.

It is appreciated that pipe belts have durability requirements to convey material, last longer and the like while also being flexible enough to form into the pipe shape.

Pipe belts are typically constructed with a flexible rubber material to provide flexibility and a large number of reinforcement layers to provide strength. This results in relatively thick and heavy pipe belt material. For example, a typical rubber based pipe belt has a stiffness of 100 N mm$^2$ and a modulus of elasticity of 20 mega pascals (MPa).

Techniques are needed to achieve selected or required stiffness and the like while also being simpler and less costly.

One or more embodiments are provided that utilize a thermoplastic elastomer (TPE) in pipe belts to enhance stiffness and simplify the design. The embodiments can enhance transverse stiffness with large diameters and thinner gauge belts, lower energy consumption during folding, unfolding, and rolling over idlers, maintain stiffness over longer time, mitigate ozone cracking, utilize recyclable materials and the like.

Figure 1:
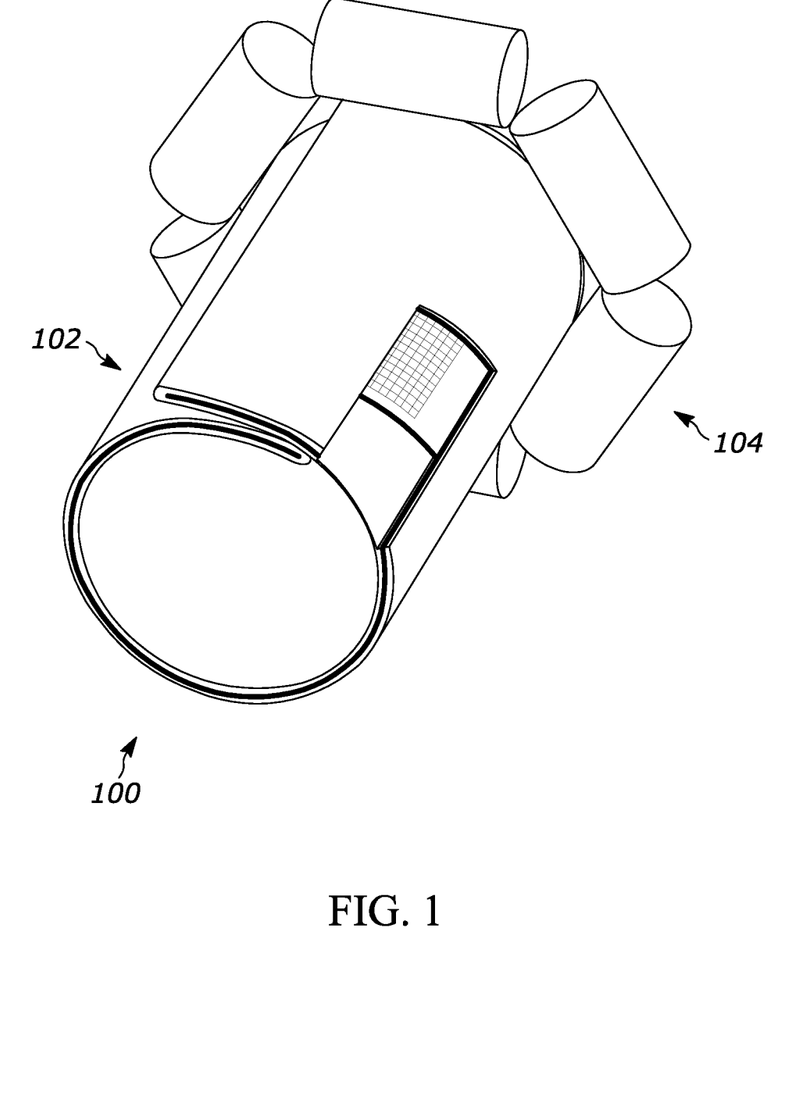
FIG. 1 is a diagram illustrating a pipe belt conveying system 100 in accordance with one or more embodiments.

FIG. 1 is a diagram illustrating a pipe belt conveying system 100 in accordance with one or more embodiments. The system 100 is provided for illustrative purposes and it is appreciated suitable variations are contemplated.

The system 100 includes a pipe conveyor belt 102 and rollers 104. The pipe belt 102 comprises a thermoplastic elastomer (TPE). The pipe belt 102 can include a top cover (TPE), one or more reinforcement layers, which are comprised of fabric, metal, steel, nylon, HMWPE and/or the like, and a bottom cover (TPE).

The pipe belt 102 is depicted with a cutaway illustrating one or more fabric layers as reinforcement layers for illustrative purposes. It is appreciated that the pipe belt 102 can include one or more reinforcement layers of fabric and the like.

The reinforcement layers comprise suitable reinforcement materials such as ultra-high-molecular-weight polyethylene (UHMW-PE), polypropylene (PP), polyethylene (PE), high molecular weight polyethylene (HMWPE), and the like.

The TPE material used in the belt 102 is substantially stiffer than conventional rubber belts. For example, the TPE material can have a modulus of elasticity of 90 Mpa and the like and be, for example, 10 times stiffer than conventional rubber materials for a similar thickness.

The system 100 is configured to transport material in a conveying direction.

The belt 102 has a rolled or pipe shape formed in a transverse direction and partially overlaps itself.

The TPE material can include thermoplastic polyolefin elastomers (TPO), thermoplastic vulcanizates (TPV), thermoplastic urethane (TPU) and the like. The TPE materials have a superior stiffness compared to rubber compounds. TPU has improved performance in material properties (abrasion, tensile strength, and the like) whereas TPV and TPO are typically lower cost than TPU.

A transverse stiffness of the belt 102 is based on properties of the TPE material, properties of reinforcement materials used, fabric, amount of yarns, spacing, thickness and the like.

The belt 102 uses TPE materials having a flexural modulus in the range 3 to 90 Mpa.

The pipe belt maximum diameter can be increased as the higher stiffness avoids pipe belt collapses in the folded position.

TPE compounds used in TPE pipe belts are naturally resisting to Ozone stress cracking when compared to styrene-butadiene rubber (SBR), natural rubber (NR), Nitrile rubbers, polyisoprene (IR), ethylene propylene diene terpolymer (EPDM), polybutadiene (BR), blends of named elastomer types and the like.

It is appreciated that TPE belt materials, such as TPV or TPU and reinforcing carcass can be 100% recyclable, while cross-linked materials, like rubbers have their limitations.

Additionally, TPU & TPV have low rolling resistance which translates into lower operating costs and lower carbon footprint and optimal/improved transverse stiffness with large diameters and thinner gauge belts.

Improve the current designs, by tailoring the stiffness of the polymer matrix material, so that the content of fabric material and overall thickness of the belt can be reduced.

This enables less layers of fabric in the belt design. This reduces the thickness of the belt, hence, reducing energy consumption of the pipe belt.

The pipe belt 102 can comprise thermoplastic elastomer (TPE), including theromplastic polyurethane (TPU) for covers and a single layer of reinforcement (fabric, steel, and Thermoplastic Polymer).

The pipe belt 102 is ozone resistant based on the incorporation of TPE.

Covers and reinforcement can be 100% recyclable.

A rolling resistance of the belt 102 is typically lower than or at least as low as other elastomers such as SBR, NR, and Nitrile.

The pipe belt 102 provides a Lower carbon footprint.

Figure 2:
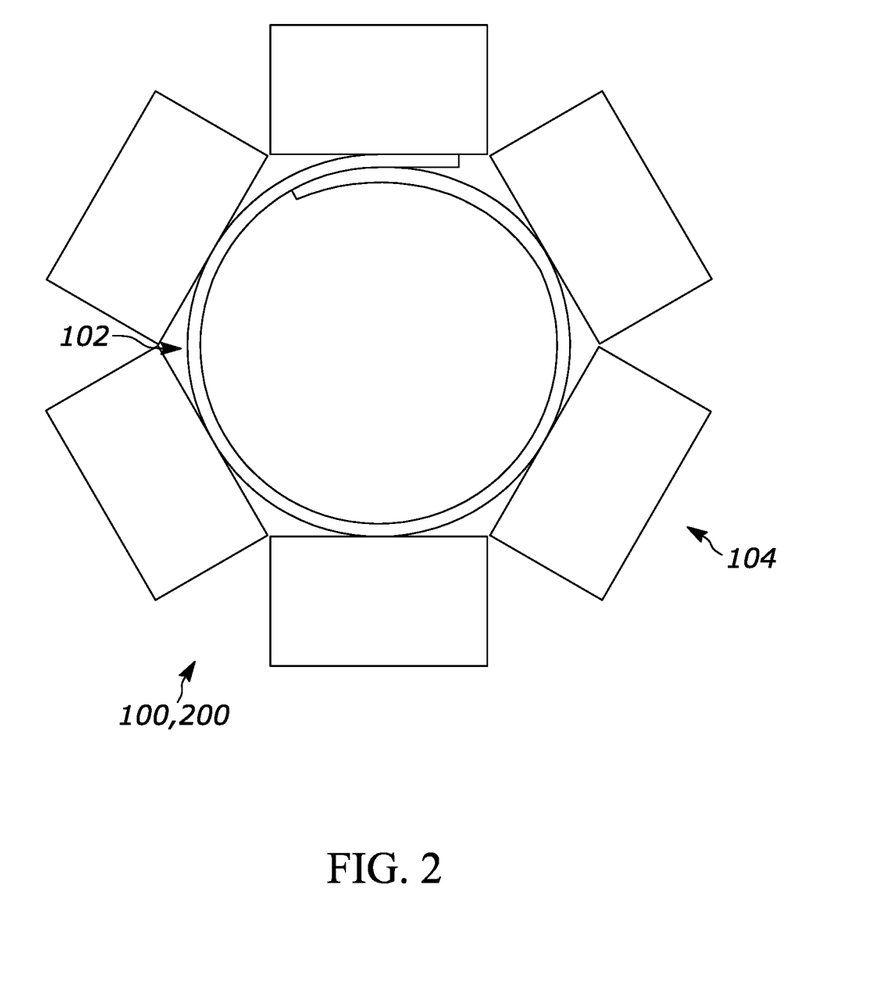
FIG. 2 is a front view of the pipe belt system 100 illustrating the pipe belt 102 in accordance with one or more embodiments.

FIG. 2 is a front view of the pipe belt system 100 illustrating the pipe belt 102 in accordance with one or more embodiments. The pipe belt 102 is provided for illustrative purposes and it is appreciated suitable variations are contemplated.

As shown, the pipe belt 102 has edges that can be folded over each other to form the pipe belt shape and mitigate spillages of conveyed material.

The rollers 104 support, direct and carry the pipe belt 102.

It is appreciated that the pipe belt 102 has a suitable diameter. In one example, the pipe belt 102 has a diameter of between about 200 mm and 600 mm. In another example, the pipe belt 102 has a diameter of about 900 mm. It is appreciated that other suitable pipe belt diameters are contemplated.

Figure 3:
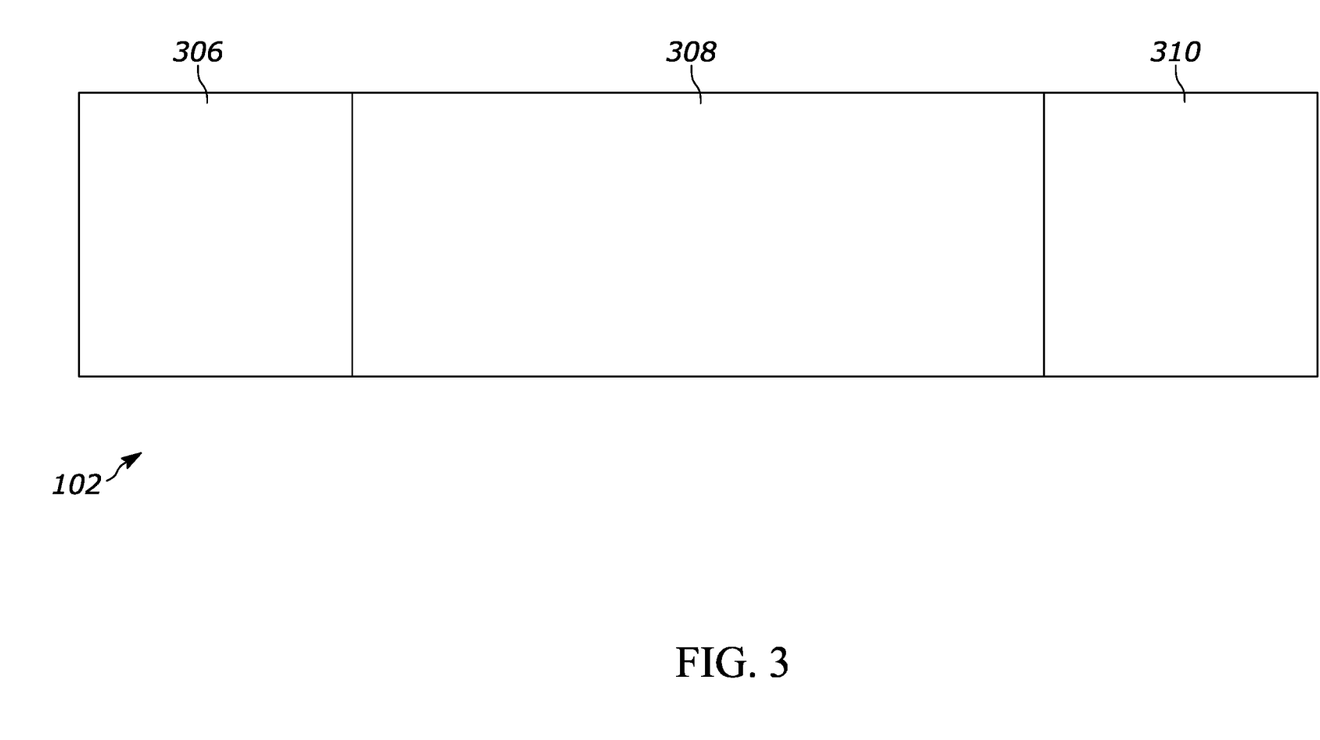
FIG. 3 is a diagram showing a cross sectional view of a pipe belt 102 in accordance with one or more embodiments.

FIG. 3 is a cross section view of the pipe belt 102 in accordance with one or more embodiments.

It is appreciated that the belt 102 is flexible and can have a variety of shapes including the pipe shape, a flat shape, a trough shape, and suitable variations thereof.

For example, when loading, the pipe belt 102 may have a relatively flat shape to facilitate adding material to be conveyed. However, the pipe belt 102 is modified to a pipe or tube shape to convey material up inclines, around bends and the like.

The pipe belt 102 is configured to have selected flexibility/stiffness across its width, expressed as flexural modulus. This property is defined as a ratio of stress to strain in flexural deformation or the tendency for a material to resist bending.

In one example, it is determined from the slope of a stress-strain curve produced by a flexural test (such as the ASTM D790) and uses units of force per area.

It is appreciated that this stiffness can vary across the belt width.

The system 100,200 transports in a conveying direction into/out of the page.

The system 100,200 includes the rollers 104 and the belt 102.

FIG. 3 is a diagram showing a cross sectional view of a pipe belt 102 in accordance with one or more embodiments.

For example, the belt 102 is shown having edge regions 306 and 310 and a middle region 308. To permit the edge regions 306 and 310 to flex more, the edge regions can be configured to be less stiff and more flexible than the middle region 308.

The flexibility/stiffness of the belt 102 is based on the TPE material, thickness of the TPE material, reinforcement, and the like. Thus, the flexural modulus at a point in the belt 102 is based on or is essentially a combined modulus of the modulus of the TPE material and modulus of the reinforcement.

For example, to make the edge region 306 more flexible, the TPE material can be thinner and the reinforcement layer reduced or eliminated. Likewise, the TPE material can be made thicker and the reinforcement material made thicker to increase the stiffness.

Some techniques to make the edge region more flexible include, for example, reduce reinforcement layer width (pull away from edge); reduce reinforcement width and use softer TPE in the edge region; use a full reinforcement width with softer TPE in the edge region.

Similar techniques, but opposite, can be utilized to make the edge region stiffer.

It is appreciated that the TPE is substantially stiffer than rubber and permits a thinner TPE material/layer to yield an equivalent stiffness as compared with a rubber based pipe belt.

Figure 4:
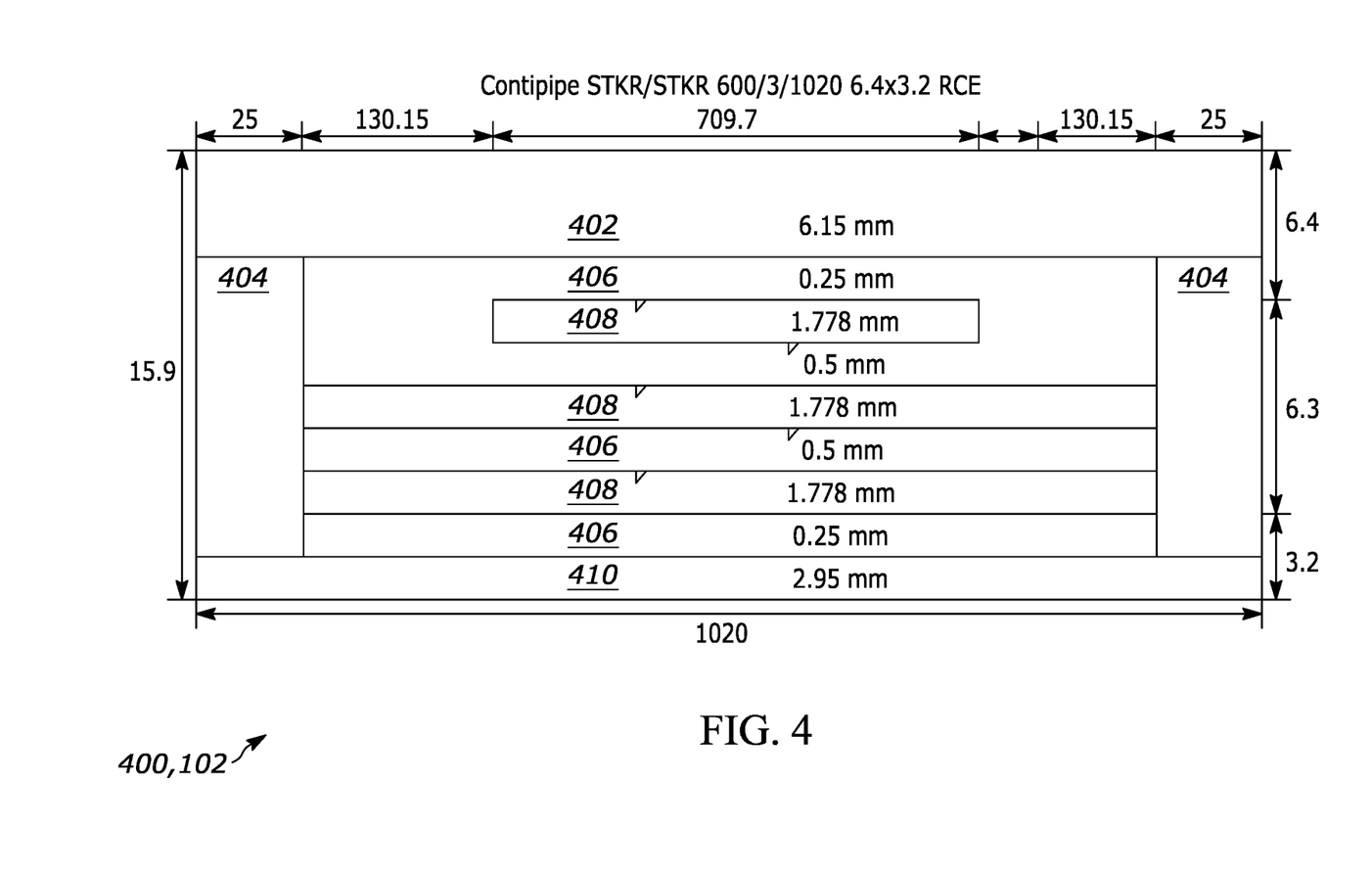
FIG. 4 is a diagram illustrating a pipe conveyor belt 400,102 in accordance with one or more embodiments.

FIG. 4 is a diagram illustrating a pipe conveyor belt 400,102 in accordance with one or more embodiments. It is appreciated that suitable variations are contemplated.

The belt 400 can be used as the belt 102 in the system 100 described above.

The belt 400 includes three fabric reinforcement layers 408 in a middle region and omits reinforcement layers in edge regions of the belt.

The belt 400 includes a cover layer 402 and a pulley layer 410 comprised of TPE. The pulley layer 410 comprises a TPE material having a varied stiffness from the cover layer 402.

Edge regions include TPE layers 404.

The belt 400 has a width of 1020 millimeters (mm) in this example.

The edge layers 404 have a width of 25 mm in one example.

Example dimensions are shown for illustrative purposes only and it is appreciated that suitable variations in dimensions are contemplated.

Figure 5:
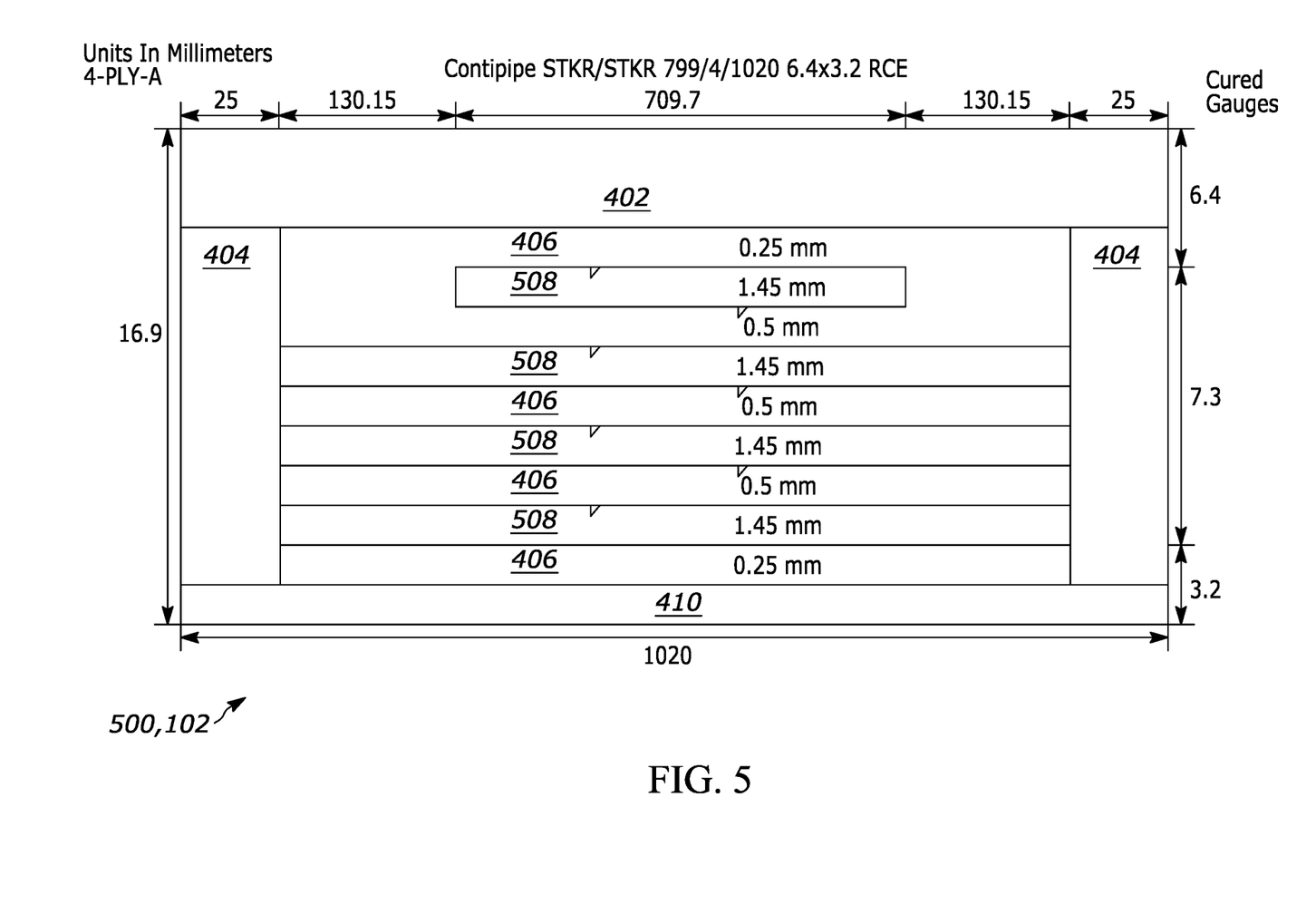
FIG. 5 is a diagram illustrating a pipe conveyor belt 500,102 in accordance with one or more embodiments.

FIG. 5 is a diagram illustrating a pipe conveyor belt 500, 102 in accordance with one or more embodiments. It is appreciated that suitable variations are contemplated.

The belt 500 can be used as the belt 102 in the system 100.

The belt 500 includes four fabric reinforcement layers 508 in a middle region and omits reinforcements in the edge regions.

A first fabric reinforcement layer has a width of 709.7 mm and the other reinforcement layers have a width of 970 mm.

Figure 6:
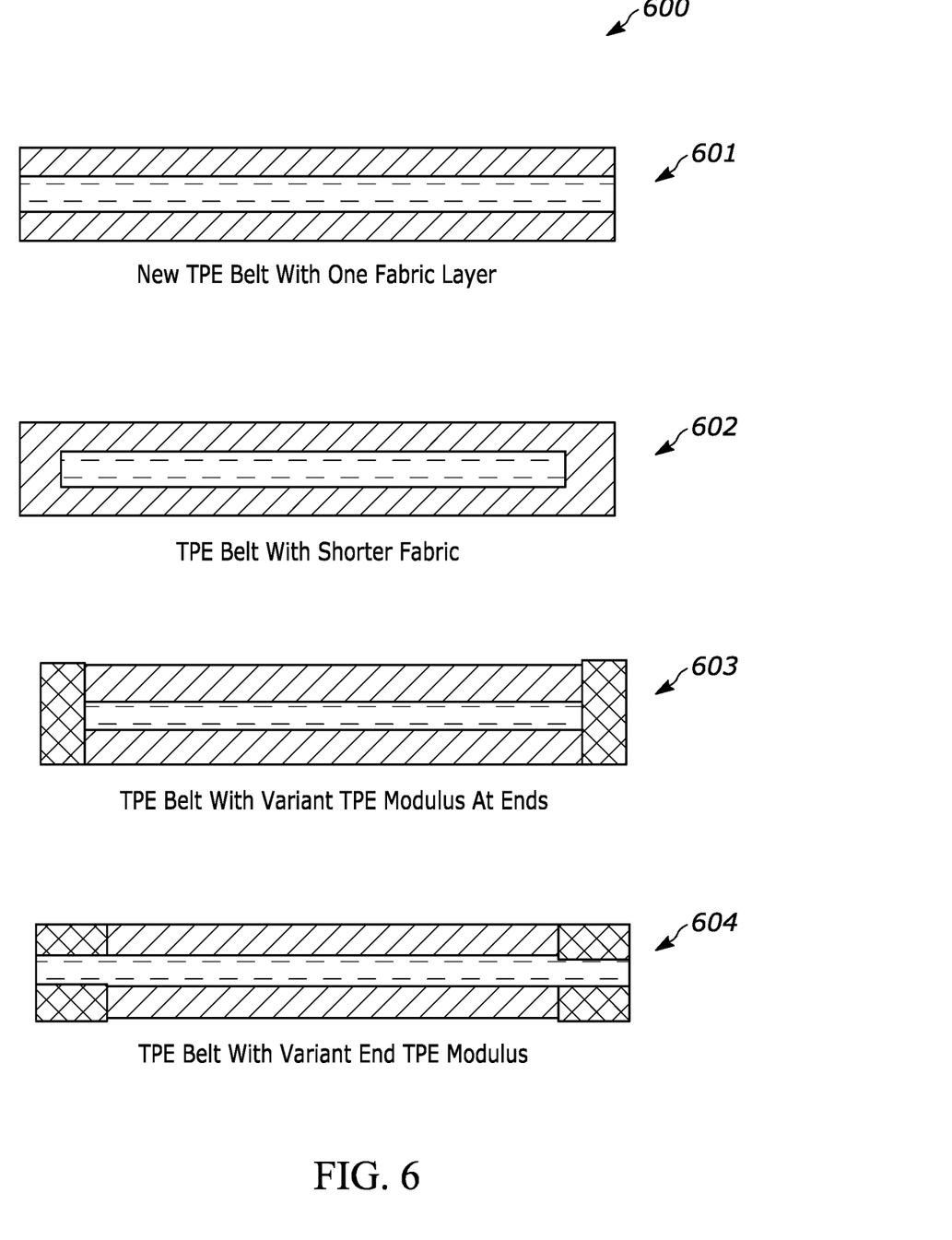
FIG. 6 is a diagram illustrating cross sectional views of a plurality of pipe belts 600 in accordance with one or more embodiments.

FIG. 6 is a diagram illustrating cross sectional views of a plurality of pipe belts 600 in accordance with one or more embodiments. It is appreciated that suitable variations are contemplated.

The pipe belts 600 can be used as the belt 102 in the system 100.

Pipe belt 601 is a TPE pipe belt with only one fabric layer.

Pipe belt 602 is a TPE pipe belt and includes a single fabric layer in a middle region and omits reinforcements in edge regions.

Pipe belt 603 is a TPE pipe belt with a fabric reinforcement layer in a middle region and its edge regions comprise TPE having a varied or different modulus from the TPE used in the middle region.

In some aspects, the techniques described herein relate to a pipe belt including: one or more thermoplastic elastomeric (TPE) layers having a first modulus of elasticity and a first stiffness and formed across a width of the belt; a reinforcement layer formed proximate to the one or more TPE layers and having a second modulus of elasticity and a second stiffness; the pipe belt configured to have an open state where the belt is substantially flat and a closed state where the belt is formed having a circular shape and partially overlaps itself; and the pipe belt has a combined modulus of elasticity based on the first modulus of elasticity and the second modulus of elasticity and a combined stiffness based on the first stiffness and the second stiffness.

In some aspects, the techniques described herein relate to a belt, the combined modulus of elasticity is configured to form the circular shape.

In some aspects, the techniques described herein relate to a belt, the one or more TPE layers having a belt thickness of less than 50 mm for pipe belt diameters at 600 mm or greater In some aspects, the techniques described herein relate to a belt, the reinforcement layer formed only within a middle region of the pipe belt and omitted from edge regions of the pipe belt.

In some aspects, the techniques described herein relate to a belt, the reinforcement layer formed only within a middle region of the pipe belt and can be extended to edge regions of the pipe belt.

In some aspects, the techniques described herein relate to a belt, the combined modulus of elasticity is less than at minimum 10% in edge regions forming an overlap of the pipe belt.

In some aspects, the techniques described herein relate to a belt, the combined stiffness varies across a width of the belt.

In some aspects, the techniques described herein relate to a belt, further including a second TPE layer having a third stiffness that is varied from the first stiffness.

In some aspects, the techniques described herein relate to a belt, the TPE layer having a modulus of elasticity greater than 20 Mpa.

In some aspects, the techniques described herein relate to a belt, the second stiffness of the fabric reinforcement layer being less than 70000 N mm².

In some aspects, the techniques described herein relate to a belt, the second modulus of elasticity being greater than 800 Mpa.

In some aspects, the techniques described herein relate to a belt, the one or more TPE layers have a lower stiffness in edge regions.

In some aspects, the techniques described herein relate to a belt, the reinforcement layer including HMWPE ropes and the ropes having increase rope pitch in edge regions to reduce transverse stiffness.

In some aspects, the techniques described herein relate to a belt, the reinforcement layer including a fabric reinforcement having a varied transverse stiffness in an edge region.

In some aspects, the techniques described herein relate to a belt, the fabric reinforcement including a first material in a middle region and a second material having a reduced transverse stiffness in an edge region.

Pipe belt 604 is a TPE pipe belt with a fabric reinforcement layer in middle and edge regions. Its edge regions comprise TPE having a varied or different modulus from the TPE used in its middle region.

It is appreciated other suitable variations are contemplated.

Figure 7:
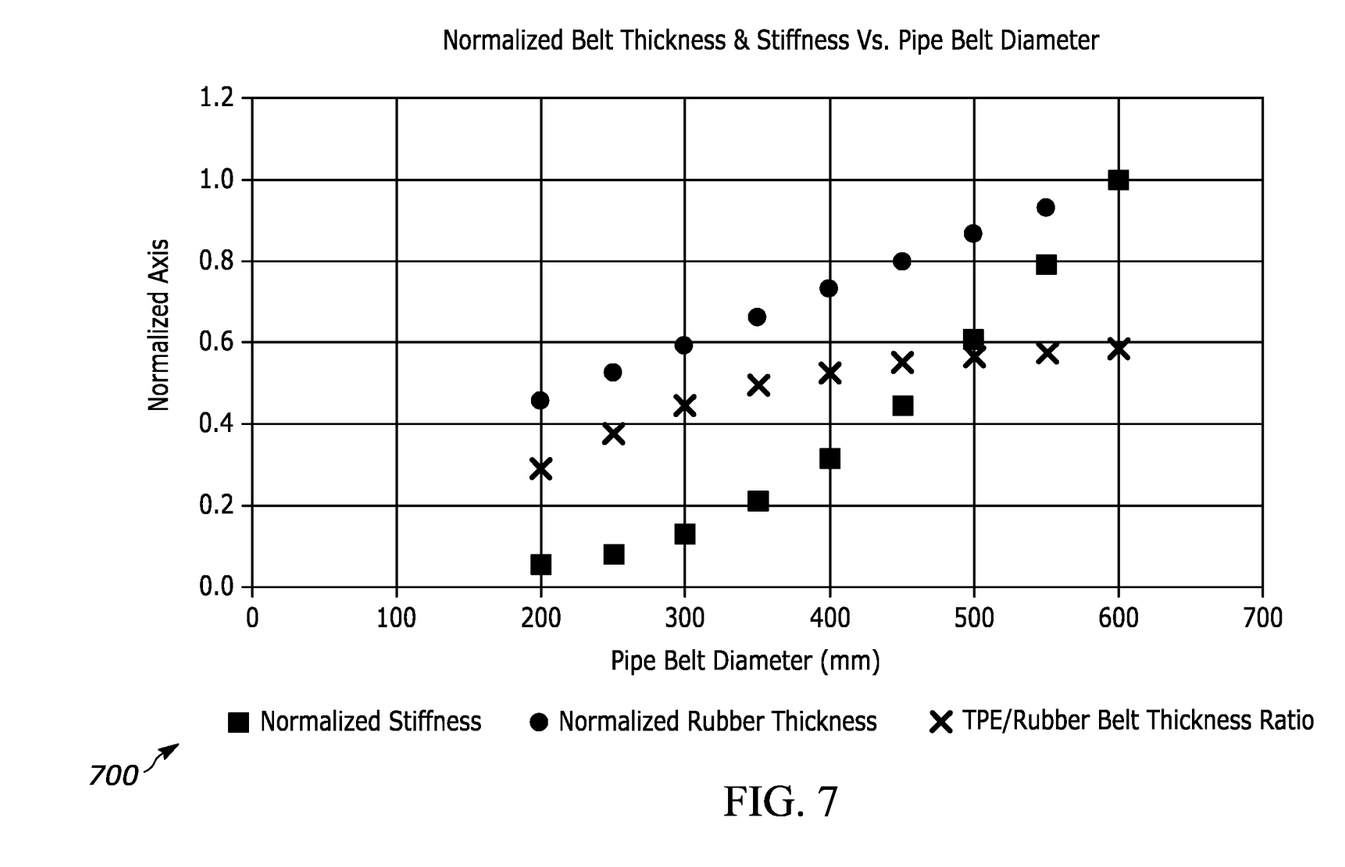
FIG. 7 is a graph 700 illustrating a relationship between pipe belt diameter, rubber belt thickness denoted by black circles markers, belt transverse stiffness denoted by black squares markers, and TPE to rubber belt thickness ratio denoted by black "X" markers in accordance with one or more embodiments.

FIG. 7 is a graph 700 illustrating a relationship between pipe belt diameter, rubber belt thickness denoted by black circles markers, belt transverse stiffness denoted by black squares markers, and TPE to rubber belt thickness ratio denoted by black "X" markers in accordance with one or more embodiments. The graph 700 is provided as an example for illustrative purposes and it is appreciated suitable variations are contemplated.

The graph 700 include pipe belt diameter on an x-axis and a normalized y-axis. The graph 700 is for a pipe belt 102 that includes a TPE layer and material.

It is appreciated that there is a linear relationship between pipe belt diameter and belt thickness as shown in the black circles. The relationship holds true for both rubber belts and TPE belts, however, at different rates or slopes.

It is appreciated that there is a second order relationship between Pipe belt diameter and belt transverse flexural stiffness as shown in black squares. The stiffness at any pipe belt diameter as shown in the figure is a requirement to maintain pipe form whether the belt is made from rubber or TPE The figure shows the advantages of TPE pipe belts over prior art of rubber belts. The advantage is shown as TPE/Rubber Belt Thickness Ratio and denoted by the black "x" marker. With flexural modulus at 90 Mpa, TPE belt thickness is about 60% of rubber belt thickness for the 600 mm pipe belt diameter in this example. This equates to as much as 40% reduction in belt thickness which translates into huge savings on belt weight and energy consumption during belt operation.

Figure 8:
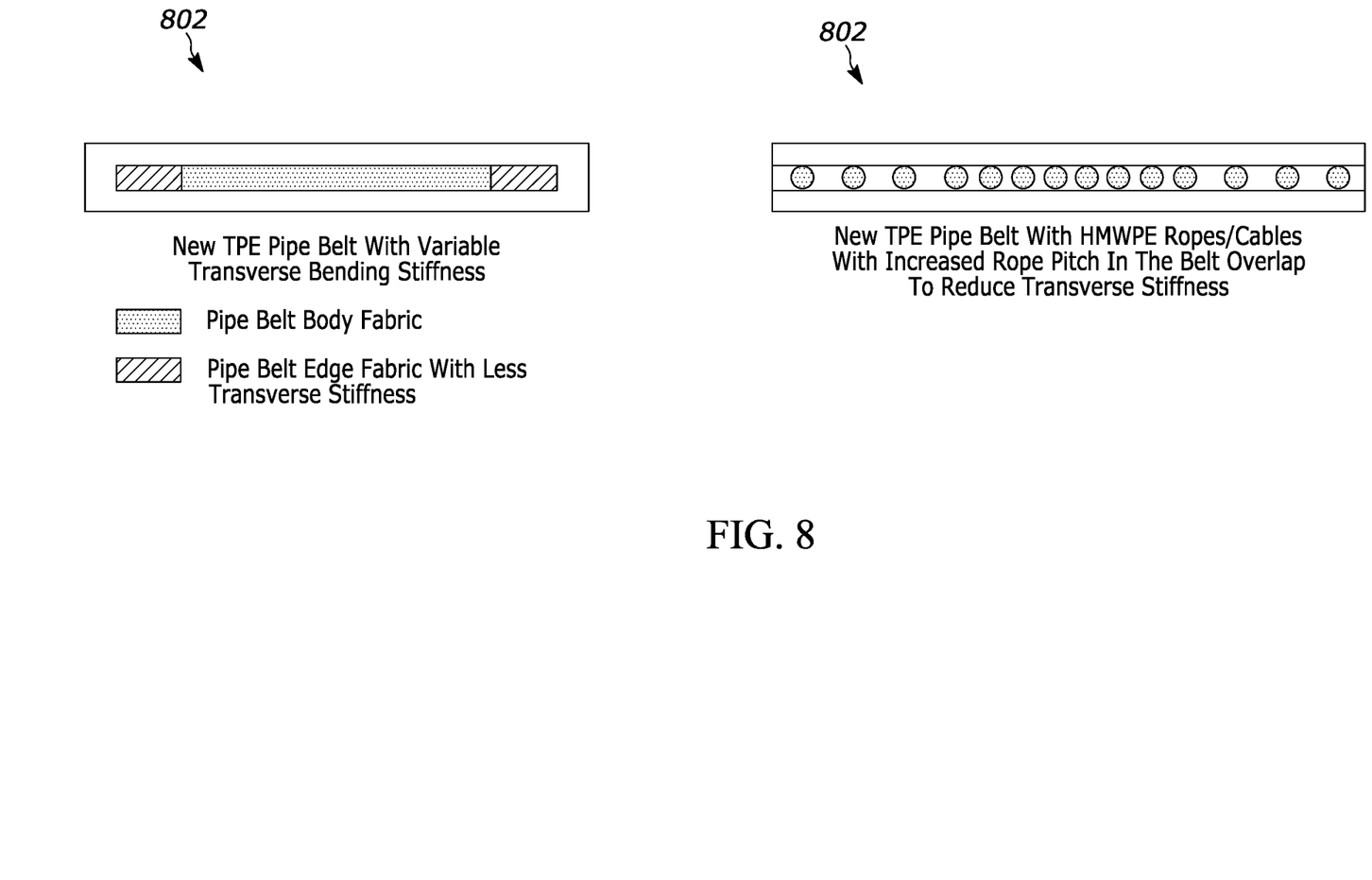
FIG. 8 is a diagram illustrating cross sectional views of a plurality of pipe belts in accordance with one or more embodiments.

FIG. 8 is a diagram illustrating cross sectional views of a plurality of pipe belts in accordance with one or more embodiments. It is appreciated that suitable variations are contemplated.

A left side of the diagram depicts a TPE pipe belt with variable transverse bending stiffness. A middle region includes a first reinforcement type, such as a fabric having a first transverse bending stiffness. Edge regions include a second reinforcement type have a second transverse bending stiffness.

Various suitable techniques can be employed to create regions having varied transverse bending stiffness. One technique is to modify pitch or spacing of fabric yarns. For example, fabric yarns can have a larger pitch or spacing in edge regions than in middle regions to have decreased transverse bending stiffness. Another technique is to utilize different fabric materials. For example, an edge fabric having a reduced stiffness compared with a middle fabric can be used to provide decreased transverse bending stiffness in the edge regions. Other techniques, such as varying amount, presence, thickness and the like of reinforcement are contemplated.

A right side of the diagram depicts a TPE pipe belt using high molecular weight polyethylene (HMWPE) compounds as reinforcements. In this example, edge regions have an increased rope pitch to reduce transverse stiffness in the edge regions.

In some aspects, the techniques described herein relate to a pipe belt including: one or more thermoplastic elastomeric (TPE) layers having a first modulus of elasticity and a first stiffness and formed across a width of the belt; a reinforcement layer formed proximate to the one or more TPE layers and having a second modulus of elasticity and a second stiffness; the pipe belt configured to have an open state where the belt is substantially flat and a closed state where the belt is formed having a circular shape and partially overlaps itself; and the pipe belt has a combined modulus of elasticity based on the first modulus of elasticity and the second modulus of elasticity and a combined stiffness based on the first stiffness and the second stiffness.

In some aspects, the techniques described herein relate to a belt, the combined modulus of elasticity is configured to form the circular shape.

In some aspects, the techniques described herein relate to a belt, the one or more TPE layers having a belt thickness of less than 50 mm for pipe belt diameters at 600 mm or greater In some aspects, the techniques described herein relate to a belt, the reinforcement layer formed only within a middle region of the pipe belt and omitted from edge regions of the pipe belt.

In some aspects, the techniques described herein relate to a belt, the reinforcement layer formed only within a middle region of the pipe belt and can be extended to edge regions of the pipe belt.

In some aspects, the techniques described herein relate to a belt, the combined modulus of elasticity is less than at minimum 10% in edge regions forming an overlap of the pipe belt.

In some aspects, the techniques described herein relate to a belt, the combined stiffness varies across a width of the belt.

In some aspects, the techniques described herein relate to a belt, further including a second TPE layer having a third stiffness that is varied from the first stiffness.

In some aspects, the techniques described herein relate to a belt, the TPE layer having a modulus of elasticity greater than 20 Mpa.

In some aspects, the techniques described herein relate to a belt, the second stiffness of the fabric reinforcement layer being less than 70000 N mm².

In some aspects, the techniques described herein relate to a belt, the second modulus of elasticity being greater than 800 Mpa.

In some aspects, the techniques described herein relate to a belt, the one or more TPE layers have a lower stiffness in edge regions.

In some aspects, the techniques described herein relate to a belt, the reinforcement layer including HMWPE ropes and the ropes having increase rope pitch in edge regions to reduce transverse stiffness.

In some aspects, the techniques described herein relate to a belt, the reinforcement layer including a fabric reinforcement having a varied transverse stiffness in an edge region.

In some aspects, the techniques described herein relate to a belt, the fabric reinforcement including a first material in a middle region and a second material having a reduced transverse stiffness in an edge region.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second", and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially-relative terms, such as "inner", "adjacent", "outer", "beneath", "below", "lower", "above", "upper", and the like, may be used herein for ease of description to describe one element or feature's relationship to another element(s) or feature(s) as illustrated in the figures. Spatially-relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially-relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A pipe belt comprising:
    one or more thermoplastic elastomeric (TPE) layers having a first modulus of elasticity and a first stiffness and formed across a width of the belt;
    a reinforcement layer formed proximate to the one or more TPE layers and having a second modulus of elasticity and a second stiffness;
    the pipe belt configured to have an open state where the belt is substantially flat and a closed state where the belt is formed having a circular shape and partially overlaps itself; and
    the pipe belt has a combined modulus of elasticity based on the first modulus of elasticity and the second modulus of elasticity and a combined stiffness based on the first stiffness and the second stiffness;
    the one or more TPE layers having a belt thickness of less than 50 mm for pipe belt diameters at 600 mm or greater.

2. The belt of claim 1, the combined modulus of elasticity is configured to form the circular shape.

3. The belt of claim 1, the reinforcement layer formed only within a middle region of the pipe belt and omitted from edge regions of the pipe belt.

4. The belt of claim 1, the reinforcement layer formed only within a middle region of the pipe belt and can be extended to edge regions of the pipe belt.

5. The belt of claim 1, the combined stiffness varies across a width of the belt.

6. The belt of claim 1, further comprising a second TPE layer having a third stiffness that is varied from the first stiffness.

7. The belt of claim 1, the TPE layer having a modulus of elasticity greater than 20 Mpa.

8. The belt of claim 1, the second stiffness of the fabric reinforcement layer being less than 70000 N mm$^2$.

9. The belt of claim 1, the second modulus of elasticity being greater than 800 Mpa.

10. The belt of claim 1, the one or more TPE layers have a lower stiffness in edge regions.

11. The belt of claim 1, the reinforcement layer comprising HMWPE ropes and the ropes having increase rope pitch in edge regions to reduce transverse stiffness.

12. The belt of claim 1, the reinforcement layer comprising a fabric reinforcement having a varied transverse stiffness in an edge region.

13. The belt of claim 12, the fabric reinforcement comprising a first material in a middle region and a second material having a reduced transverse stiffness in the edge region.

14. The belt of claim 1, the TPE layer having its first modulus of elasticity being greater than 20 Mpa, and the second modulus of elasticity of the reinforcement layer being greater than 800 Mpa.

15. A pipe belt comprising:
    one or more thermoplastic elastomeric (TPE) layers having a first modulus of elasticity and a first stiffness and formed across a width of the belt;
    a reinforcement layer formed proximate to the one or more TPE layers and having a second modulus of elasticity and a second stiffness;
    the pipe belt configured to have an open state where the belt is substantially flat and a closed state where the belt is formed having a circular shape and partially overlaps itself; and
    the pipe belt has a combined modulus of elasticity based on the first modulus of elasticity and the second modulus of elasticity and a combined stiffness based on the first stiffness and the second stiffness;
    the pipe belt further comprising a second TPE layer having a third stiffness that is varied from the first stiffness.

16. The belt of claim 15, the TPE layer having its first modulus of elasticity being greater than 20 Mpa, and the second modulus of elasticity of the reinforcement layer being greater than 800 Mpa.

17. A pipe belt comprising:
    one or more thermoplastic elastomeric (TPE) layers having a first modulus of elasticity and a first stiffness and formed across a width of the belt;
    a reinforcement layer formed proximate to the one or more TPE layers and having a second modulus of elasticity and a second stiffness;

the pipe belt configured to have an open state where the belt is substantially flat and a closed state where the belt is formed having a circular shape and partially overlaps itself; and the pipe belt has a combined modulus of elasticity based on the first modulus of elasticity and the second modulus of elasticity and a combined stiffness based on the first stiffness and the second stiffness;

the one or more TPE layers have a lower stiffness in edge regions.

18. The belt of claim 17, the reinforcement layer having a reduced transverse stiffness in its edge regions.

19. The belt of claim 17, the reinforcement layer comprising a fabric reinforcement comprising a first material in a middle region and a second material having a reduced transverse stiffness in edge regions; or the reinforcement layer comprising HMWPE ropes and the ropes having increase rope pitch in edge regions to reduce transverse stiffness.

20. A pipe belt comprising:

one or more thermoplastic elastomeric (TPE) layers having a first modulus of elasticity and a first stiffness and formed across a width of the belt;

a reinforcement layer formed proximate to the one or more TPE layers and having a second modulus of elasticity and a second stiffness;

the pipe belt configured to have an open state where the belt is substantially flat and a closed state where the belt is formed having a circular shape and partially overlaps itself; and the pipe belt has a combined modulus of elasticity based on the first modulus of elasticity and the second modulus of elasticity and a combined stiffness based on the first stiffness and the second stiffness;

the reinforcement layer comprising HMWPE ropes and the ropes having increase rope pitch in edge regions to reduce transverse stiffness.

\* \* \* \* \*